Feb. 15, 1966  R. E. HOLLOWAY ETAL  3,235,633
METHOD OF MOLDING FILTER END CAPS
Original Filed March 2, 1959  2 Sheets-Sheet 1
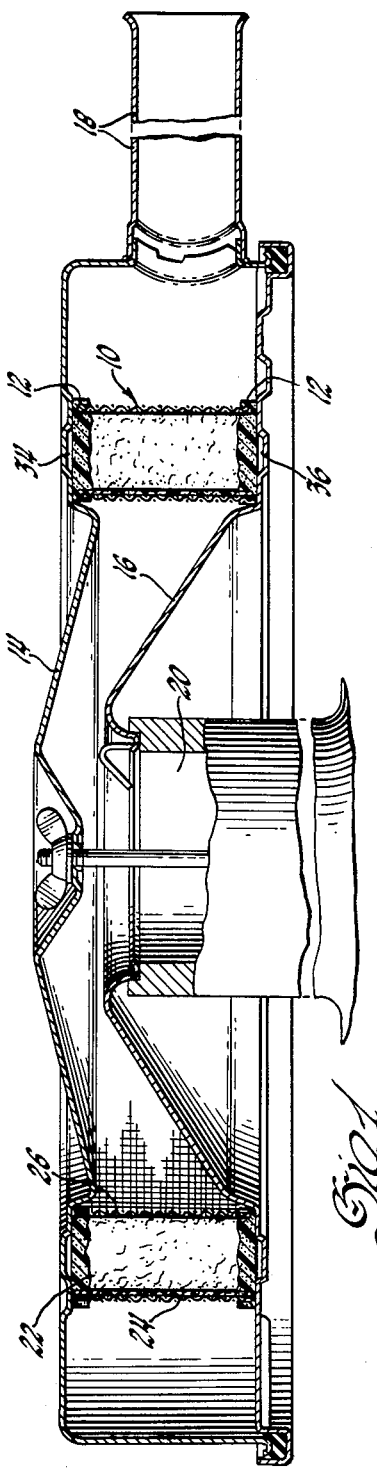
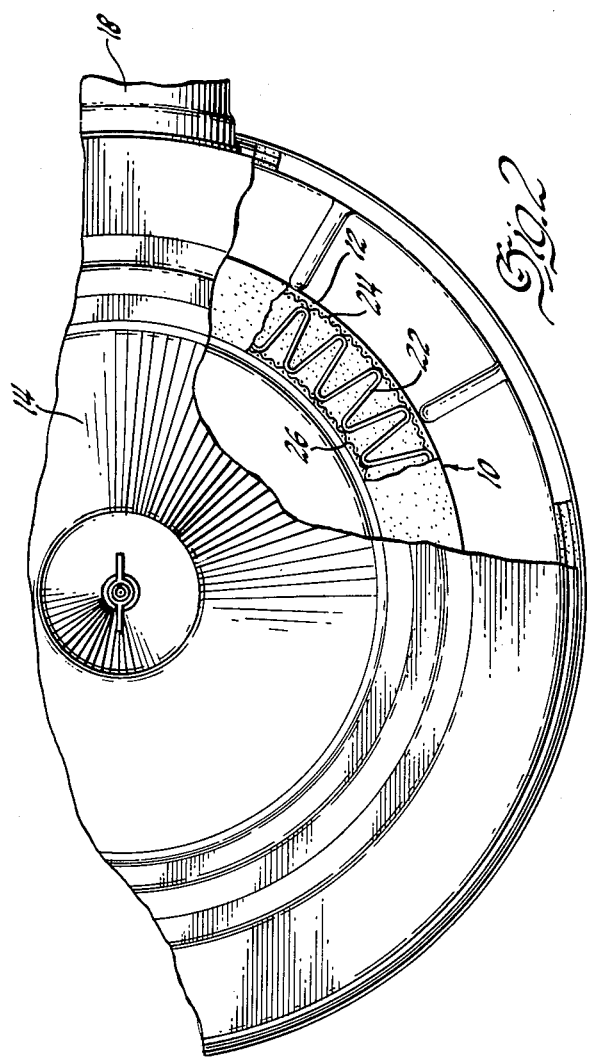
INVENTORS
Robert E. Holloway
BY & James A. Norton
Peter P. Kozak
ATTORNEY

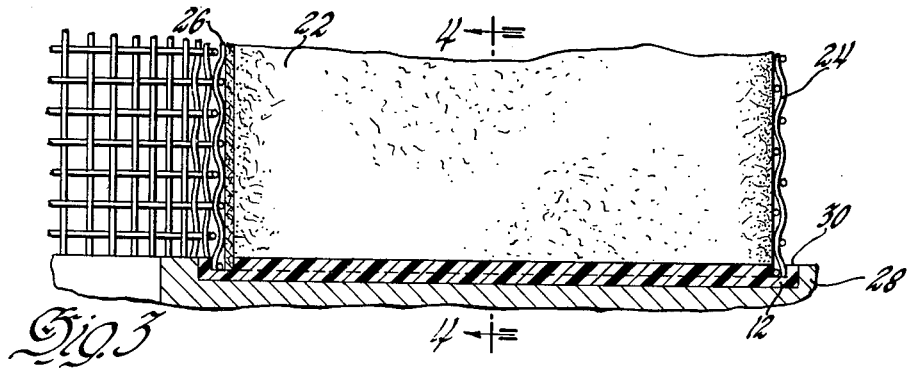
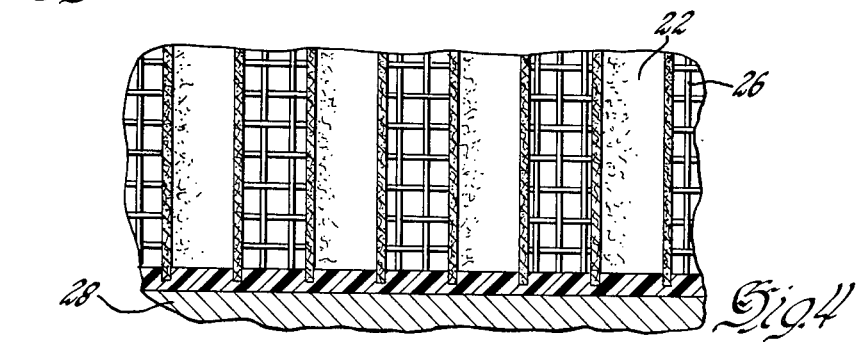
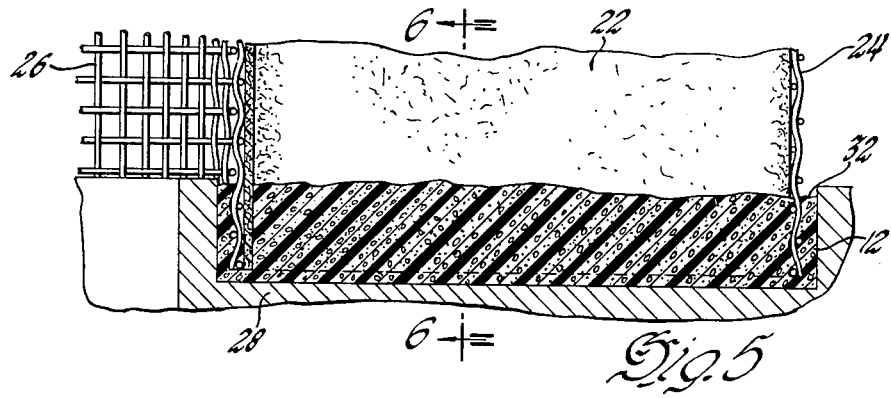
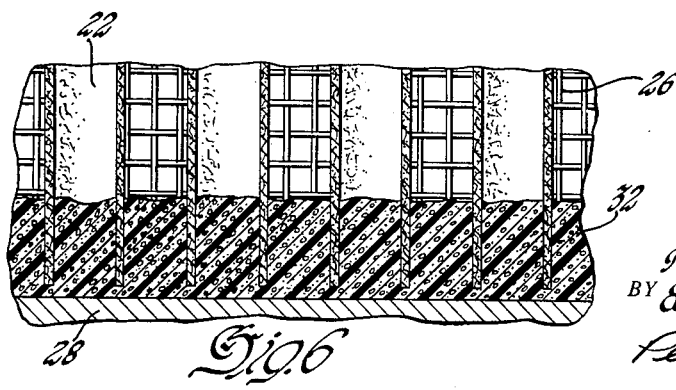

United States Patent Office 3,235,633
Patented Feb. 15, 1966

---

3,235,633
METHOD OF MOLDING FILTER END CAPS
Robert E. Holloway, Durand, and James A. Norton, Flint, Mich., assignors to General Motors Corporation, Detroit, Mich., a corporation of Delaware
Continuation of application Ser. No. 796,529, Mar. 2, 1959. This application Apr. 2, 1962, Ser. No. 184,483
4 Claims. (Cl. 264—45)

This is a continuation of the patent application Serial No. 796,529, filed March 2, 1959 and assigned to the assignee of the present invention and now abandoned.

This invention relates to filters and more particularly to an improved method of making a replaceable filter element of the convoluted or pleated type.

The conventional replacement filter element may take a number of forms of which the more common is the pleated paper type. In producing this type of element a length of filter paper is usually treated with a resinous impregnating material such as a phenolic condensation product, folded into pleats of a desired dimension and formed to a suitable continuous shape such as a cylinder, and heated to a temperature for a time sufficient to polymerize the resinous substances. A final step involves the bonding of end caps to each end of the pleated member. When the element is placed in a filter housing, it is usually necessary that a seal be provided between the inlet and outlet passages of the housing and the end caps of the filter element to insure that unfiltered fluid will not bypass the filter element.

In recent years it has become conventional to form the filter element end caps of a plastic composition such as those based on polyvinyl chloride to serve as a structural supporting member regidifying the paper element and as an end seal between the filter element and the housing. The polyvinyl chloride end caps are usually applied by depositing a relatively thin layer of a polyvinyl chloride plastisol on the base of a suitably shaped mold cavity, placing the paper filter element in the plastisol layer and then heating the resin and the paper element to the fusion temperature of the polyvinyl chloride plastisol to effect a fusion of the polyvinyl chloride layer to the paper filter element. A filter element of this type and the process for making it presents considerable difficulties in that the polyvinyl chloride material is not sufficiently resilient to enable it to serve well as a gasket element in itself. Various attempts have been made to cure this defect such as the formation of relatively thin, continuous ribs or ridges and the like on the end cap surface and the formulation of vinyl plastisol compositions which sacrifice strength for greater flexibility. The vinyl resin end caps also have the disadvantage of deteriorating with age due to the loss of the plasticizer as, for example, by slow vaporization.

The process of applying the vinyl resin end caps also presents problems in that the plastisol must be heated to a temperature of about 350° F., a temperature close to the charring temperature of the paper, for a substantial period of time sufficient to cause solution of the vinyl resin in the plasticizer and a fusion of the resin so that the curing temperature of the plastisol must be carefully controlled to avoid charring of the paper. Care must also be taken to insure that all end portions of the paper element are immersed or placed in contact with the plastisol to effect a seal at all points of the paper element ends. Since it is desirable to provide protective and supporting metallic screens at the inner and outer surfaces of the paper elements, particular care must be taken to insure that these screens are sufficiently immersed in the plastisol to effect a mechanical lock between the vinyl resin and the screens since the vinyl resin has poor adhesive qualities toward metal. Care must also be taken to maintain the moisture content of the paper at a minimum; otherwise there would be caused a blistering of the end cap due to the evaporation of the moisture during the curing process. A further disadvantage is that the process requires that an end cap be applied to one end of the paper element and subjected to the plastisol fusion temperature and then subsequently that an end cap be applied to the opposite end of the paper element in a similar manner. This procedure not only requires a considerable amount of time but twice subjects the paper element to the possibility of charring in the event that plastisol fusion temperatures are not carefully controlled.

It is an object of this invention to manufacture a filter element of the pleated paper type having end caps which more efficiently rigidify the filter element structure and also serve as seals or gaskets between the filter element and the filter housing in connection with which it is used. It is a further object of the invention to provide an improved method of forming a filter element whereby more efficient end caps are more economically and efficiently molded onto the ends of the paper element.

These and other objects are accomplished by depositing a layer of a foamable polyurethane resin in a suitably shaped mold cavity, immersing or placing the ends of the filter element in the foamable resin or in contact therewith, and reacting the resin whereby it foams and rises between the folds of the paper element to thereby seal the filter element ends and solidify to form a flexible foam, rubber-like end cap capable of functioning efficiently as a gasket between the filter element and the filter housing. The polyurethane resin used is preferably of a substantially closed cell type capable of acting as a satisfactory seal or gasket. In the foaming process a skin forms on the surfaces of the resin which further enables the foamed resin to function as an efficient seal. The skin foams both on those surfaces which contact the atmosphere and those which contact the mold. Preferably, rigid screens or the like are disposed adjacent the inner and outer axial sides of the pleated paper element, and these are immersed in the foamable polyurethane resin mixture together with the paper element whereby these reinforcing members are also mechanically locked and bonded within the polyurethane foam due to the inherent adhesive character of the polyurethane resin with respect to metal and the paper as well as to purely mechanical locking with the screen interstices. The resulting filter element is rigid in structure and capable of resisting considerable compressive force axially thereof. In use, the end caps compressably and deformably engage the filter housing members to effect an efficient seal between the filter element and the filter housing.

Other objects and advantages of the present invention will become more apparent from a consideration of the following description of preferred embodiments of the invention, reference being made to the accompanying drawings in which:

FIGURE 1 is a cross sectional elevation view of the filter element of the present invention positioned within a filter housing;

FIGURE 2 is a top view of the filter assembly shown in FIGURE 1;

FIGURE 3 is an enlarged cross sectional view of a fragment of a mold element immersed in a layer of foamable polyurethane resin deposited in the cavity of an annular mold;

FIGURE 4 is a fragmentary cross sectional view taken along the line 4—4 of FIGURE 3;

FIGURE 5 is identical to FIGURE 3 except that the polyurethane resin is shown in a fully reacted and cured state; and FIGURE 6 is a fragmentary cross sectional view taken along the line 6—6 of FIGURE 5.

Referring to FIGURE 1, the present invention is concerned with a filter element 10 of the pleated paper type, sealed on its opposite ends 12, which is positioned between an upper housing member 14 and a lower housing member 16 and is operative to filter atmospheric air entering the inlet conduit 18 and passing to the engine carburetor through the vertical passage 20.

The filter element consists of an annular pleated paper element 22, an annular, rigid screen 24 positioned on the outer side of the paper element and a rigid screen 26 positioned on the inner side of the paper element, which are rigidly held together by means of the end caps 12.

The present invention is particularly concerned with improved end caps 12 which more efficiently hold the filter element parts together and form a gasket or seal between the filter element 10 and the housing members 14 and 16. The present invention comprehends the use of a polyurethane foam to form the end caps 12 which, in the process of forming the end caps, foams and swells between the paper folds of the paper element and about the screen elements to form an end cap which securely holds the screen members 24 and 26 and the paper element 22 together and forms an end cap which is in the nature of a resilient or flexible foam capable of being compressibly seated between the housing members 14 and 16 and forming an effective gasket or seal.

In forming the end caps an annular mold member 28 is provided as shown in FIGURE 3. A relatively thin layer of a foamable polyurethane mixture 30 is next deposited within the mold cavity. The filter element components including the pleated paper element 22, the outer screen element 24 and the inner screen element 26 are then inserted in the mold cavity of the mold 28. Preferably these filter element components are immersed in the foamable polyurethane resin layer 30. However, it is only necessary in order to form a satisfactory and efficient end cap that the various end portions of these components be placed merely in contact or in close proximity to the foamable layer 30. Preferably these components are held in place by suitable means such as bosses or projections (not shown) on the mold surface during at least the first portion of the subsequent forming and curing action. This is desirable to prevent the filter element 22 and the screen elements 24 and 26 from contacting the bottom of the mold cavity which otherwise would lead to a discontinuous structure in the outer surface of the finished end caps. Thereafter the foamable polyurethane resin layer 30 is permitted to react whereby this layer swells or foams into a layer several times its original deposited thickness as is illustrated in FIGURE 5 and penetrates between the folds of the filter element and in and about the interstices of the screen members 24 and 26. On curing, due to the inherent capacity of polyurethane foams to adhesively bond to metal and paper during the reaction thereof, the end cap becomes mechanically locked and firmly, adhesively bonded to the ends of the screen members 24 and 26 and the paper member 22. The polyurethane foam is preferably of the closed cell type and when molded, forms a skin on the surface thereof, whereby the end caps function efficiently as a gasket material.

By the term "foamable polyurethane resin" as used herein, is meant, in a broad sense, a reaction mixture including a monomeric and/or a polymeric material having a plurality of free hydrogen reactive groups, an organic polyisocyanate, and a compound capable of influencing the reaction with an evolution of a gas, leading to the formation of the foam product.

It is well known that a wide variety of cellular plastic materials of an elastic consistency, generally known as elastic or flexible polyurethane foams, may be made by an essentially polyaddition or condensation reaction of a wide variety of organic, monomeric and/or polymeric materials containing a plurality of free hydrogen reactive groups and an organic polyisocyanate in the presence of cross-linking materials, compounds promoting the evolution of a gas during the reaction, catalytic agents, plasticizers, fillers and other reaction controlling ingredients and materials affecting the physical and chemical properties of the foamed polyurethane plastics.

Among the organic materials having free reactive hydrogen groups which may be utilized are polyesters, polyesteramides, alkylene glycols, polyisocyanate-modified alkylene glycols, polyoxyalkylene glycols, polyisocyanate-modified polyoxyalkylene glycols, castor oil, polyols, etc.

Suitable organic polyisocyanates which may be utilized in the production of polyurethane products are 2,4 toluene diisocyanate and 2,6 toluene diisocyanate, ethylene diisocyanate, propylene 1,2 diisocyanate, butylene 1,3 diisocyanate, hexylene diisocyanate, cyclohexylene 1,2 diisocyanate, M-phenylene diisocyanate, 3,3 dimethyl, 4,4 diphenylene diisocyanate, tri-phenyl methane triisocyanate, 15, naphthalene diisocyanate and suitable mixtures of these and other similar polyisocyanates.

The reaction process referred to above involves a series of complex physical and chemical reactions accompanied by a considerable increase in viscosity and the evolution of heat. The reacting mixture may be caused to foam by inclusion of a relatively highly volatile liquid such as dichlorodifluoromethane in liquid form which will vaporize in the mixture or other compound capable of releasing a gas when the reaction reaches a predetermined viscosity and a predetermined temperature. Usually, however, foaming of the reacting polyurethane mixture is achieved by the evolution of carbon dioxide gas resulting from the reaction of the precursor components thereof. Thus, the carbon dioxide gas may result from the reaction of isocyanate groups of the organic polyisocyanate with a carboxyl group of the polymeric material or other component or from the reaction of isocyanate groups with water.

A number of methods may be employed in making the elastic polyurethane foam involved in the present invention. In some instances, the monomeric and/or polymeric materials may be admixed with the polyisocyanate component together with a catalyst such as an amine (usually a tertiary amine), a foam-producing constituent such as water and a cross-linking constituent such as a polyfunctional alcohol, and immediately reacted to produce a foam. Other inert constituents such as plasticizers, fillers, dyes or pigments and the like may be conveniently first admixed with the monomeric and/or polymeric material or one of the other constituents.

In other instances the reaction and character of the foam may be more readily controlled by first reacting the monomeric and/or polymeric constituent with a predetermined excess of the organic polyisocyanate to produce an intermediate polymer or prepolymer. The prepolymer may then be admixed with the other inert constituents such as plasticizers, fillers, dyes and the like. The prepolymer is then admixed with a chain-extending or cross-linking polyfunctional constituent and a foam-producing constituent such as water to produce a foam product.

It is readily apparent that suitable polyurethane products may be formed from a wide variety of materials. The production of foamed polyurethane products having sufficient body and strength to rigidify the filter element assembly and yet be sufficiently elastic or flexible to serve as a gasket material requires a suitable selection of precursor components, viscosities and functionality of the polymeric constituents, proportions of the precursor materials and reaction conditions.

An example of the preparation of a suitable elastic, substantially closed cell polyurethane material for use in the present invention is as follows: 100 parts of polybutylene ether glycol (preferably of the purity standard known in the trade as "resin grade") having a hydroxyl number of about 38 are reacted with 12.5 parts of a mixture of 80% 2,4 toluene diisocyanate and 20% 2,6 toluene diisocyanate at 135° F. to 145° F. for about two hours. Thereafter, 12.5 more parts of the organic polyisocyanates are added to the mixture and reacted for an additional two hours at a temperature of 280° F. to 290° F. This reaction product or prepolymer is then cooled to about 150° F. and a sufficient quantity of the organic polyisocyanates is added to adjust the free isocyanate group content to between 9.0% and 9.5%. 100 parts of the thus-adjusted prepolymer are then thoroughly admixed with 9.2 parts of 1,2,6 hexanetriol, 0.2 part water and 1 part N-methyl morpholine and reacted to form a satisfactory foam product.

In forming the filter element in accordance with the invention, the prepolymer is fed into a high speed, enclosed mixing chamber simultaneously with the separate feeding to said mixing chamber of a mixture of the 1,2,6 hexanetriol, water and N-methyl morpholine in the above-stated proportions. Referring to FIGURE 3, the resulting mixture is immediately deposited as a thin, uniform layer 30 on the base of the cavity of the mold 28. At this time the mixture begins to react, but at this stage the reaction does not result in an appreciable increase in volume. The filter assembly including the paper element 22 and the inner and outer screen elements 26 and 24, respectively, are promptly placed on or immersed in the foamable resin layer 30. Thereafter, in a like manner, a layer of the foamable polyurethane resin is deposited in the cavity of a second mold (not shown), identical to the mold 28 and the opposite end of the filter assembly is similarly placed in contact with the second foamable resin layer. The first resin layer 30 has meanwhile reacted sufficiently so that it will not flow appreciably due to gravity when the filter element is inverted so as to immerse the opposite end of the filter element into the second foamable resin layer. Although the resin will foam and cure at room temperature in an exothermic reaction over a period of up to several hours to give a satisfactory final product, the resulting sandwich is then preferably inserted in a convection oven, heated suitably to about 250° F. to 300° F. and within about 10 minutes, the polyurethane layers expand to several times their original thickness as illustrated in FIGURES 5 and 6. These layers 32 expand into the filter element and envelop the ends of the pleated paper and screen elements. Since the polyurethane foam is normally adhesive in relation to the paper and the metal, a firm bond is obtained which produces a firm, high strength filter element. The molds are, of course, either constructed of a material which is nonadherent to the polyurethane, or else are coated with a suitable mold release agent to prevent sticking of the resin to the molds. The resulting polyurethane foam end caps are sufficiently flexible or elastic to provide an efficient gasket between the filter element and the filter housing elements 14 and 16 as shown in FIGURE 1. Preferably to take maximum advantage of the flexible character of the end caps, the housing members 14 and 16 are provided with grooves 34 and 36 into which portions of the end caps are caused to flow when the filter element is clamped in the housing to provide for an efficient seal.

Advantageous variations may be employed in the preparation of the polyurethane foam employing the above-described formulation. 0.5 to 2.0 parts of a suitable dye or pigment may be admixed with the prepolymer to provide the end caps with an attractive color. To some extent the flexibility of the foam may be controlled by admixing up to about 20 parts of a suitable plasticizer such as dibutyl phthalate or didecyl phthalate with the prepolymer. However, the flexibility of the foam is preferably controlled by a suitable selection of precursor materials in suitable proportions. Other catalytic agents such as 0.3 part of triethylamine may be used in place of the 1 part of N-methyl morpholine. The 1,2,6 hexanetriol may be replaced in whole or in part by the polyethylene glycol having a molecular weight of about 200 in proportions of about 2.23 parts of the polyethylene glycol per 1 part of the hexanetriol.

If desirable in carrying out the process of applying the end caps to the filter element assembly, the foaming reaction may be slowed down by substituting up to 10% of tripropylene glycol for the polyethylene glycol or hexanetriol on approximately a 1 to 1 basis for the polyethylene glycol and on approximately a 2.25 to 1 basis for the hexanetriol.

The above formulation may also be varied by substituting other polyhydroxy materials such as castor oil or other polyalkylene glycols including polypropylene glycol and polyethylene glycol or mixtures or copolymers of these glycols of suitable molecular weight to produce a foamed product of desired flexibility.

While the present invention has been described in terms of a specific embodiment, it is to be understood that other forms may be adapted within the spirit of the invention.

We claim:

1. A method of making a filter element including a porous, fibrous annulus and end caps serving as a combined closure and gasket for the annulus, the steps comprising depositing a layer of a foamable polyurethane resin capable of forming a flexible, foamed polyurethane mass in the base of an annular mold, immersing an end of said annulus in said layer and then subjecting said foamable resin to heat at a temperature substantially below the charring temperature of said annulus whereby the resin is caused to foam and rise so as to completely envelop said end of said annulus.

2. A method of making a filter element including an annulus formed of a pleated, porous, fibrous sheet having pleats extending longitudinally thereof and end caps serving as a combined closure and gasket for the annulus, the steps comprising depositing a layer of a foamable polyurethane resin capable of forming a flexible, substantially closed cell foamed mass in the base of an annular mold, placing an end of said annulus in contact with said layer and permitting said resin to foam and cure whereby the foamed resin rises between said plates so as to completely envelop said ends of said annulus, said resin being permitted to foam under the influence of heat at a temperature substantially below the charring temperature of said fibrous annulus.

3. A method of making a filter element including an annulus formed of a pleated, porous, fibrous sheet having pleats extending longitudinally thereof, inner and outer screen members disposed adjacent the inner and outer longitudinal sides of the annulus and a combined closure and gasket for the ends of said annulus and screens, the steps comprising depositing a layer of foamable polyurethane resin capable of reacting to form a flexible, foamed polyurethane mass in the base of an annular mold, placing an end of said annulus and screens in contact with said layer and subjecting said resin to heat whereby said resin is caused to foam and cure and rise so as to penetrate between the folds of said annulus and envelope said ends of said annulus and screens.

4. A method of making a filter element including an annulus formed of a porous, fibrous sheet and end caps serving as a combined closure and gasket for the annulus, the steps comprising depositing a self sustaining layer of a foamable polyurethane resin capable of reacting to form a flexible, foamed mass in the base of an annular mold, placing an end of said annulus in contact with said layer, depositing a second self-sustaining layer of said foamable resin in the base of a second annular mold, placing the opposite end of said annulus in contact with said second layer, and then simultaneously subjecting said resin layers to heat whereby the resin foam rises so as to completely envelop the ends of said annulus.

References Cited by the Examiner
UNITED STATES PATENTS

| | | | |
|---|---|---|---|
| 2,732,031 | 1/1956 | Rabbit et al. | 55—502 XR |
| 2,771,156 | 11/1956 | Kasten et al. | 55—502 XR |
| 2,895,174 | 7/1959 | Hockett | 264—257 |
| 2,929,800 | 3/1960 | Hill | 260—77.5 |
| 2,996,145 | 8/1961 | Thornburgh | 55—502 XR |
| 2,999,562 | 9/1961 | Lechtenberg | 55—502 |
| 3,005,213 | 10/1961 | Brown et al. | 264—45 XR |
| 3,011,218 | 12/1961 | Mitten | 264—54 |
| 3,036,342 | 5/1962 | Fino | 264—257 |
| 3,055,845 | 9/1962 | Merten et al. | 260—2.5 |
| 3,139,369 | 6/1964 | Sullivan et al. | 264—45 XR |
| 3,183,285 | 5/1965 | Boylan | 264—45 |
| 3,183,286 | 5/1965 | Harms | 264—45 |

FOREIGN PATENTS 680,211  10/1952  Great Britain.

ALEXANDER H. BRODMERKEL, *Primary Examiner.*

RUEBEN FRIEDMAN, *Examiner.*